Sept. 13, 1949.        R. N. SABEE ET AL        2,481,951
METHOD OF MAKING TUBULAR PLASTIC ARTICLE
Original Filed Jan. 29, 1945
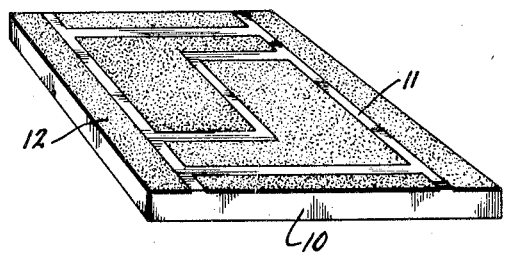
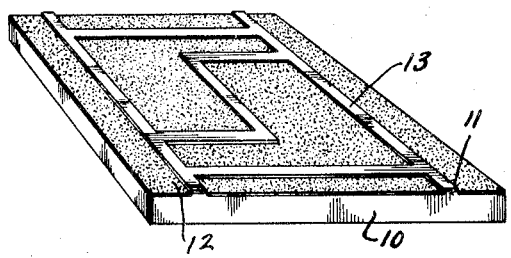
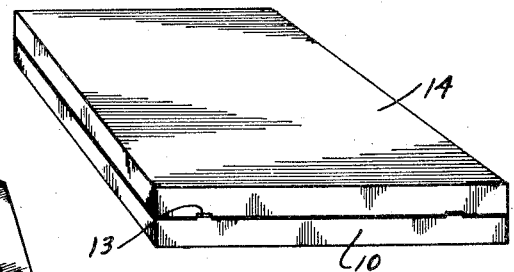
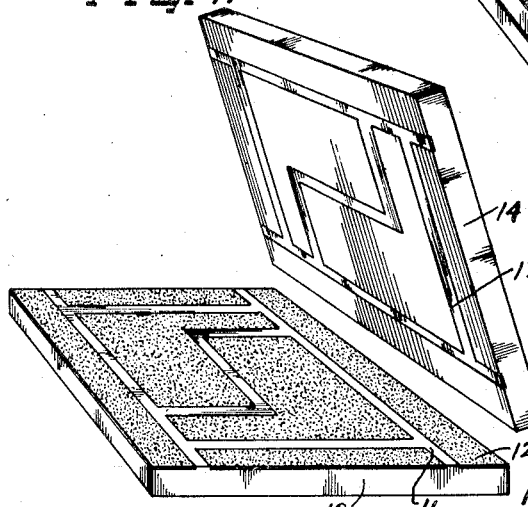
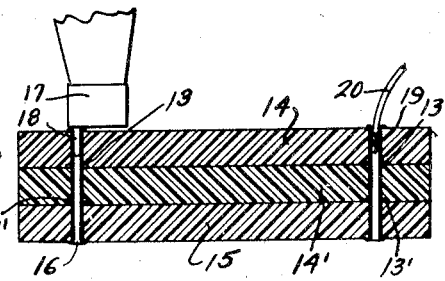
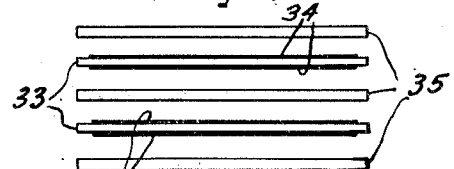
Inventors
CHARLES S. WHITE
REINHARDT N. SABEE Patented Sept. 13, 1949

2,481,951

UNITED STATES PATENT OFFICE 2,481,951

METHOD OF MAKING TUBULAR PLASTIC ARTICLES

Reinhardt N. Sabee, Detroit, and Charles S. White, Dearborn, Mich., assignors of one-fifth to said Sabee, one-fifth to Francis A. Grady, Detroit, Mich., three-tenths to Charles F. Meroni, Evanston, Ill., one-fifth to Vernon S. Lilly, Detroit, Mich., and one-tenth to Frank A. Grady Original application January 29, 1945, Serial No. 575,116. Divided and this application February 14, 1945, Serial No. 577,792

2 Claims. (Cl. 154—94)

This invention relates to a plastic structure and methods of manufacture and more particularly to a prefabricated electrical circuit structure.

The subject matter of this application has been divided from our copending application, Serial No. 575,116, filed January 29, 1945 issued on August 24, 1948 into Letters Patent No. 2,447,541.

Heretofore in the manufacture of articles embracing particles, portions and electrical conductors of metal, it has been necessary to expend a great deal of labor in fabricating the metal in a suitable carrier; and as a matter of fact, labor, as a consequence, has been one of the main factors of expense in the ultimate product. This is particularly true in the case of devices embracing electrical circuits.

It is an aim of our invention in another application of the same, to obviate, for example, the necessity of using covered wire in an electrical circuit, of having to solder wires together and to electrical apparatus, and of having to provide a separate chassis for the wired apparatus.

An object of this invention is to provide a structure and a method of making the same wherein a circuit is made up of predetermined patterns of metal directly applied to one or more layers of electrically non-conductive material, which structure obviates the necessity of soldered connections, and which structure in itself serves as the chassis for electrical apparatus to be interconnected by the circuit.

While the structure to which our invention is applicable is of a very diversified character, we have in accordance with the features of this invention, accomplished the same through the provision of a novel method of making an article wherein metal of a predetermined pattern is electrolytically deposited on a cathode, then directly embedded or adhered to a mass of plastic or carrier, and wherein the mass of plastic, whether it be in sheet, strip, tubular or rod form, is employed to strip the deposited metal from the cathode.

In one form of the invention, the plastic is in sheet form, and the electrolytically deposited metal stripped from the cathode by the sheet is in the form of strips, which correspond to portions of an electric circuit of any desired magnitude or conductive characteristics, In accordance with still other features of the invention, as applied to the form of the invention embracing the method of applying electrolytically deposited metal of predetermined pattern to a plastic sheet, the steps thereof may be supplemented by additional steps such as pressing together a plurality of these sheets each having a different pattern of metal thereon and electrically interconnecting the metal patterns so that the ultimate product comprises a base or a chassis for an electrical apparatus, such as a radio, and wherein the parts of the apparatus may be electrically connected to the circuit embodied in the sheets without the necessity of using any soldered connections.

While we have disclosed our invention as being embodied in two principal forms, one of tubular configuration and the other of sheet construction, it is to be understood that our invention is not to be thus limited but only insofar as defined by the claims hereto appended.

Other objects and features of this invention will more fully appear from the following detailed description taken into connection with the accompanying drawings which illustrate several embodiments thereof, and in which Figure 1 is a somewhat diagrammatic perspective view of a cathode plate having a predetermined exposed pattern on which metal is to be electrolytically deposited, the portions between the strips of the pattern being covered by a "resist" or non-conductive material;

Figure 2 is a view similar to Figure 1, showing metal deposited on the exposed resist-free portions of a cathode plate;

Figure 3 is a diagrammatic perspective view, illustrating how a mass or sheet of plastic is applied to a cathode plate for the purpose of stripping the metal deposit therefrom;

Figure 4 is a diagrammatic perspective view showing the cathode plate and the plastic sheet in separated condition with the deposit embedded in the plastic;

Figure 5 is a diagrammatic view illustrating how a plurality of plastic sheets with different deposits thereon having aligned portions are electrically interconnected by metallic sleeves formed to cooperate electrically with pieces of apparatus, such as prongs of a radio tube or terminals of a conductor; and Figure 6 is a diagrammatic illustration of a further modification of the invention.

It is believed that the several forms of the novel articles of manufacture made possible by the use of the processes of our invention will be fully understood from the following description of the processes as used in making flat and tubular composite plastic and metal structures.

The reference character 10 designates generally a cathode plate, which may be of any suitable or conventional material, such, for example, as stainless steel. As is well known, in electrolytically depositing metal the cathode may be provided with any suitable design, which design may be either in relieved or raised form. The spaces separating the portions of the pattern and in which no metal is to be deposited are filled with what is called in the trade, a resist or a non-conductive material. For example, the resist may comprise any one of the well known materials for this purpose, such, for example, as a non-conductive acid resisting lacquer or paint, porcelain, rubber or some types of plastic.

We propose to recess by etching or otherwise in the usual way the portion of the plate on which no metal is to be deposited leaving the pattern 11 in a raised form on the plate. This pattern may be of any suitable configuration, such for example, as strips so arranged as to constitute the pattern for an electrical circuit or the like. The recessed portions on which no metal is to be deposited are filled in with a non-conductive or resist material, designated generally by the reference character 12.

It is, of course, understood that all exposed surfaces on the cathode plate on which no deposit is to be made may be coated with resist or non-conductive material.

The cathode is suspended in the usual way by hooks or the like in a conventional electrolyte and connected in the usual way for the deposit of metal, such as copper thereon. The silver or copper, as is clear, is only deposited on the conductive pattern 11 and such deposit is designated by the reference character 13 in the accompanying drawings.

As is well known in the electrolytic metal depositing arts, the depositing of the metal can be so controlled so as to obtain any degree of thinness of deposit desired on any portion of the design consistent with the ultimate requirements to which the deposited metal is to be put. We contemplate that the pattern in this form of the invention shall be of such configuration and conductivity as to constitute an electrical circuit or a portion thereof. In other words, the strip-like deposits of copper will take the place of wires in an electrical apparatus or radio if the product of our invention is utilized. The character and extent of the deposit can be mathematically determined with precision consistent with the requirements of the circuit which is to be made up by the deposit.

In the illustrated embodiment, it will be perceived that due to the fact that the top of the plate is relatively smooth, the copper deposit 13 will project beyond the normal plane of the surface. Thereafter a mass or sheet 14 of plastic material, preferably of synthetic plastic, is pressed onto the plated surface of the cathode plate 10. Any suitable synthetic plastic may be employed, such, for example, as vinyl resin or ethyl cellulose plastics. The plate 10 and the sheet of plastic 14 thereon may be pressed together in a suitable press, and if so desired, heat may be employed to augment the pressing action. It will be perceived from Figure 3 that as a result of this pressing action, the metallic deposit 13 is embedded in the surface of the plastic sheet 14 facing and contiguous with the plated surface of the cathode 10.

Thereafter, we find that we can strip the plastic sheet 14 from the cathode plate 10, leaving the cathode plate 10 in its original form prior to plating, and with the metallic pattern 13 adhering to the plastic sheet 14. It will be appreciated that the metallic pattern 13 may be of any extent or design consistent with the ultimate requirements of it and the use to which it is to be put. Moreover, due to the fact that the deposit 13 may be of a very fine and fragile nature, the pressing of it directly onto the plastic avoids any necessity for manually handling or removing it from the cathode, which would be very difficult particularly if the pattern were a very fragile one.

In addition, it will be further understood that electrolytically deposited copper is very pure copper, and hence lends itself admirably to form an electrical circuit. The electrolytic process can be so controlled that a copper deposit of any fineness or electrical conductive characteristics can be obtained. In fact, one sheet may be provided with a deposit of one pattern of predetermined electrical characteristics and another sheet may have a design of a different pattern of different electrical characteristics.

The circuits or portions of circuits embraced by the several deposits on different sheets may be so predetermined and arranged to cooperate with each other in an ultimate pile-up or assembly of sheets into a common unit with the metallic deposit in contact with the surface of another sheet. In Figure 5, we have illustrated such a common unit wherein two sheets of plastic 14 and 14' are placed one above the other, each sheet having a deposit of a different electrical design, and with portions adapted to vertically align with each other for electrical connection. In the upper sheet, it will be perceived that portions of the deposit 13 are aligned with portions of the deposit 13' of the lower sheet 14'. An additional sheet of plain plastic 15 may be provided, if it is so desired, to serve as a bottom ply for the pile-up, although the use of such a sheet is optional. The various layers may be pressed together under suitable pressure and heat and joined by suitable binders to integralize the sheets.

Thereafter the aligned portions of the metal deposits 13—13' may be electrically interconnected by punching holes through the portions and inserting metal eyelets transversely through the plies. These eyelets may be so arranged as to, for example, receive the prongs of a radio tube. We have illustrated such a tube at 17 and have shown one of its prongs 18 inserted in one of the metal sleeves 16. The other sleeve 16 may have inclined metal tangs or prongs 19 therein for wedgingly gripping the end of a wire conductor 20. This arrangement, as is evident, obviates the necessity for any soldered connections.

Thus the pile-up of sheets shown in Figure 5 not only comprises in them an electrical circuit, but in addition serves as a base or chassis for an electrical apparatus, whether the apparatus be in the form of a radio, a control panel, a television set or the like. In any event, the predisposition of the electrical deposits is such that they may all be intertied and electrically connected by metal inserts or sleeves. A circuit is thus made available for the connection of pieces of electrical equipment thereto by the means of insertion of terminals in the metal sleeves in much the same way as a plug is introduced in a socket of a telephone switchboard.

While we have for purposes of illustration shown a circuit as being embodied in several layers of plastic material, it, of course, will be understood that the invention can be used equally well with one layer or with any number of layers depending upon the extensives of the circuit involved or the compactness of the base or chassis desired.

The plastic employed in carrying out our invention may be in sheet or powder form, since the invention lends itself to the pressing and heating of the plastic to any desired ultimate shape.

In Figure 6, we have illustrated a still further modification of the invention, wherein a multiple of cathode plates 33—33, each having metallic deposits 34—34 on both sides thereof of any predetermined configuration, are sandwiched between a plurality of plastic sheets 35. The plastic sheets 35 may be of material similar to that of the previously described plastic sheet. Similarly the cathode plates 33—33 may be of material similar to that of the previously described cathodes, such as the cathode 10.

The multiple of sheets shown in Figure 6 are adapted to be pressed together in a suitable press in the same manner as we have described in the first form of the invention. After the pressing operation the sheets are separated so that the plastic sheets 35—35 strip the metallic or copper deposits 34—34 from the cathodes. This arrangement is desirable from the standpoint of augmenting the productivity of the cathode plates and enabling metal to be removed from both sides thereof simultaneously. The cathode deposits 34—34 may be of any suitable configuration, such as an electrical circuit of the type described in connection with the preferred form of the invention.

Thereafter the plurality of plastic sheets may be pressed together or against other plastic sheets in the manner like that described in connection with Figure 5.

Our method can be practiced with tubular or rod cathodes as well as with sheet cathodes. For illustration, the cathode 10, if in cylindrical rod form, would have the copper or silver deposit of predetermined pattern on the periphery of the rod. The deposit would, in that event, be stripped from the cathode by forming and pressing a sleeve of plastic around the cathode. This sleeve with the pattern of electrolytic metal embedded in its inner surface can be used singly or can be used in nested or telescoped relation with similar sleeves but of different diameters.

It is also contemplated that the metal deposits in such an assembly or build-up of sleeves would be electrically interconnected by transverse elements similar to the tubes 17 of Fig. 5.

In all forms of the invention, however, the design of electrolytical metal deposits are predetermined on the cathode and are stripped directly from the cathode by means of a carrier in the form of plastic going to make up the ultimate product, which is a composite of plastic and metal. In all forms the process lends itself to any degree of fineness or precision of design of deposit desired, as there is no manual intermediate operation required to remove the deposit from the highly polished stainless steel cathode. In the one form the process makes possible a substantially flat or sheet-like composite plastic and metal article; and in another form, makes possible a tube-like cylindrical or rod-type composite plastic and metal article.

We claim as our invention:

1. In a method of making a plastic article, the steps of electrolytically depositing, on a rod-like cathode, metal in such arrangement as to ultimately constitute a part of an electrical circuit in the article, removing the cathode with the deposit thereon from the electrolyte, forming a tubular sleeve of plastic against the deposit on the cathode and thereafter stripping the deposit by means of said sleeve from the cathode.

2. In a method of making a tubular plastic article, the steps of adhering an electric circuit pattern on an inner surface of a sleeve made of electrical insulating plastic material, and placing said sleeve in telescoping relation with a similar sleeve and selectively interconnecting the circuit patterns on said sleeves to form a given electrical circuit.

REINHARDT N. SABEE.
CHARLES S. WHITE.

REFERENCES CITED

The following references are of record in the file of this patent:

UNITED STATES PATENTS

| Number | Name | Date |
|---|---|---|
| 509,951 | Schroder | Dec. 5, 1893 |
| 416,976 | Walters | Dec. 10, 1889 |
| 676,357 | Enduweit | June 11, 1901 |
| 1,563,731 | Ducas | Dec. 1, 1925 |
| 1,647,474 | Seymour | Nov. 1, 1927 |
| 1,718,993 | Wermine | July 2, 1929 |
| 1,731,415 | Grupe | Oct. 15, 1929 |
| 1,741,443 | Slade | Dec. 21, 1929 |
| 1,907,771 | Fellner | May 9, 1933 |
| 1,939,130 | Mills | Dec. 12, 1933 |
| 1,945,142 | Fichtmueller | Jan. 30, 1934 |
| 1,974,763 | Wirth | Sept. 25, 1934 |
| 2,066,511 | Arlt | Jan. 5, 1937 |
| 2,066,876 | Carpenter | Jan. 5, 1937 |
| 2,105,440 | Miller | Jan. 11, 1938 |
| 2,164,010 | Grupe | June 27, 1939 |
| 2,312,652 | Komives et al. | Mar. 2, 1943 |
| 2,441,960 | Eisler | May 25, 1948 |
| 2,447,541 | Sabee | Aug. 24, 1948 |

FOREIGN PATENTS

| Number | Country | Date |
|---|---|---|
| 19,919 | Great Britain | 1892 |
| 201,092 | Great Britain | July 26, 1923 |